United States Patent [19]

Chobanov et al.

[11] 4,447,376

[45] May 8, 1984

[54] MANUFACTURE OF ELECTROCHEMICAL HIGH TEMPERATURE CELLS

[75] Inventors: Tsvetko Chobanov, Frankfurt; Dieter Künze, Kelkheim; Friedrich Woeffler, Frankfurt, all of Fed. Rep. of Germany

[73] Assignee: Varta Batterie Aktiengesellschaft, Hanover, Fed. Rep. of Germany

[21] Appl. No.: 291,410

[22] Filed: Aug. 10, 1981

[30] Foreign Application Priority Data

Aug. 29, 1980 [DE] Fed. Rep. of Germany ....... 3032552

[51] Int. Cl.$^3$ .............................................. B29D 27/00
[52] U.S. Cl. ...................................... 264/42; 29/623.1; 264/46.4; 264/49; 429/112
[58] Field of Search ................... 264/42, 44, 49, 46.4; 429/112; 29/623.1, 623.4, 623.5

[56] References Cited

U.S. PATENT DOCUMENTS

| | | | |
|---|---|---|---|
| 1,458,376 | 6/1923 | Anderson | 264/44 |
| 3,120,457 | 2/1964 | Duddy | 29/623.1 X |
| 3,266,893 | 8/1966 | Duddy | 264/44 X |
| 3,285,873 | 11/1966 | Bailey | 264/44 X |
| 3,471,330 | 10/1969 | Berger et al. | 429/112 |
| 3,510,359 | 5/1970 | Selover et al. | |
| 3,607,414 | 9/1971 | Kumano et al. | 429/112 |
| 3,607,415 | 9/1971 | Kummer et al. | 429/112 |
| 3,625,765 | 12/1971 | Arrance et al. | 29/623.1 |
| 3,625,767 | 12/1971 | Clark et al. | 429/112 |
| 3,725,132 | 4/1973 | Moser et al. | 429/112 |
| 3,928,520 | 12/1975 | Shinomoto et al. | 264/42 |
| 4,080,414 | 3/1978 | Anderson et al. | 264/44 X |
| 4,086,396 | 4/1978 | Mathers et al. | 429/112 X |
| 4,087,905 | 5/1978 | Cooper et al. | 29/623.1 |
| 4,172,319 | 10/1979 | Bloom et al. | 29/623.5 X |
| 4,237,083 | 12/1980 | Young et al. | 521/64 X |
| 4,306,004 | 12/1981 | Kaun et al. | 429/112 |
| 4,320,184 | 3/1982 | Bernstein et al. | 29/623.1 X |
| 4,320,185 | 3/1982 | Bernstein et al. | 29/623.1 X |

FOREIGN PATENT DOCUMENTS

2847464 5/1980 Fed. Rep. of Germany .

*Primary Examiner*—Philip E. Anderson
*Attorney, Agent, or Firm*—Weiser, Stapler & Kimmelman

[57] ABSTRACT

In the manufacture of cells, e.g. of the system Li-Al/LiCl-KCl/FeS$_x$, the finely divided raw materials for the electrodes and for an included ceramic separator are respectively mixed individually with the electrolyte salt, as well as with a synthetic plastic which is decomposable without residue under heat. The mixtures are rolled into plates, and the plates are heated above the decomposition temperature of the plastic after assembly. The plastic is preferably a polyhydrocarbon such as polyisobutylene and is preferably introduced by means of a solvent. It makes the powder mixtures plastifiable and suitable for rolling. This makes it possible to produce ceramic separators, which are fundamentally composed only of loose particle accumulations, in the form of plates of uniform structure and strength and to handle these in the same way as electrode plates during cell assembly.

17 Claims, No Drawings

MANUFACTURE OF ELECTROCHEMICAL HIGH TEMPERATURE CELLS

The invention relates to a process of manufacture of an electrochemical high temperature cell having a solid positive electrode, a solid negative electrode, a separator of finely divided ceramic material, and a molten liquid electrolyte which is retained within the cell components.

High temperature cells of the type under consideration operate, for example, on the basis of the rechargeable electrochemical system Li-Al/LiCl-KCl/FeS$_x$ (where x=1 or 2).

In view of the operating temperature of about 450° C., which exceeds the melting point of most eutectic electrolyte salt mixtures, the Li electrode is strengthened by alloy formation with Al.

The separator of such a cell must not only withstand the extreme temperature conditions, which also entrain additional corrosion problems, but must also mechanically resist the cyclic volume changes of the electrodes.

It is true that ceramic materials such as beryllium oxide (BeO), thorium oxide (ThO$_2$), magnesium oxide (MgO), lithium aluminate (LiAlO$_2$), boron nitride (BN), silicon nitride (SI$_3$N$_4$) or aluminum nitride (AlN), which are named as temperature and corrosion resistant separator materials in U.S. Pat. No. 3,510,359, indeed fully meet the thermal and chemical requirements. However, the shaping of the separator presents difficulties because the ceramic material itself is not ion conductive, and ion permeability, which is as significant as permeability for the molten liquid electrolyte, can only be obtained by means of an open structure.

Separators of boron nitride fabric, or matting, are known, but these are relatively expensive and are of limited utility because of their poor wettability by the molten electrolyte and because of their low mechanical stability.

A substantially simpler separator, which is formed simply by a particle accumulation that fills the space between the electrodes and consists of fragmented ceramic material and which also has the desired mechanical robustness, is disclosed in German Patent Publication (Offenlegungsschrift) No. 2,847,464 and in corresponding U.S. patent application Ser. No. 073,621 now abandoned. The voids within the particles, which are not firmly connected to each other but are freely movable relative to each other, are filled with powdered electrolyte salt.

A disadvantage of this ceramic separator is its preparation by pouring or by vibrating-in of a powder, which is a method that is not readily compatible with those techniques which are otherwise conventional in cell manufacture. Moreover, it is unavoidable that certain variations in porosity and thickness of the accumulation must be tolerated. The result of these variations is to also create local changes in the internal resistance of the separator layer. These inhomogoneities in turn are the cause of non-uniform current density distribution within the electrodes, which contributes to disintegration of the separator and of the electrodes.

The separator must also be sufficiently impermeable to the electrode materials. This requires that the maximum pore diameter of the separator and the minimum particle diameter of the electrode materials must be matched to each other.

Accordingly, it is an object of the present invention to provide a process of manufacture of a separator from finely divided ceramic material which is not subject to the drawbacks mentioned above.

A further object of the invention is to also integrate into such a manufacturing process, to the extent possible, the electrodes which are conventionally pressed from powders.

This and other objects which will appear are achieved in accordance with the invention by mixing the finely divided raw material of the separator and/or of the electrodes with electrolyte powder and with a plastic which is decomposable without residue by heat. The mixture is rolled into a cohesive plate of uniform thickness. The plates are assembled into a cell individually, or after being rolled together as composite electrode(s)/separator plates. Finally, the cell is heated above the decomposition temperature of the plastic following complete assembly.

The process embodying the invention generally makes it possible to render materials which are composed of powders or powder mixtures plastifiable and therefore capable of being rolled. This is particularly significant for solid electrodes, because it is only by rolling that they can be reduced to extremely small thickness dimensions while maintaining high uniformity of material density. Thin electrodes are an indispensable prerequisite for high specific current loads.

A particular advantage of the process embodying the invention resides in the possibility of producing a ceramic separator which always has uniform structure and thickness, from what is initially only a loose particle accumulation and also to handle the same during cell assembly like a solid plate in the same way as the electrodes.

The plastic additive to the finely divided material or powder, which imparts rolling capability to it, can be of various types. It must be capable of again being removed after assembly and before putting the cell into operation. Therefore, a synthetic resin selected for that purpose should have no functional groups which react with components of the cell. During thermal decomposition of the plastic after plate assembly, no solid carbon must remain as a residue in the separator because this could cause short circuits. On the other hand, decomposition products such as H$_2$O or HCl can be tolerated only in very small quantities in view of the sensitive Li electrode. Particularly suitable for plastifying are therefore polyhydrocarbons with quarternary carbon groups. Among these, polyisobutylene holds a particularly preferred position in accordance with the invention.

The process embodying the invention is further described below by means of examples for the manufacture of a ceramic separator. The same principle can be used in accordance with the invention to prepare positive electrode plates, e.g. from FeS powder, or negative electrode plates, e.g. from a Li-Al-alloy powder. In those cases, selection of the proper relationship between electrode powder and electrolyte powder in the rolled mixture depends upon the wettability of the former, but can also be largely a matter of choice. In general, however, it is desirable that the proportion of the electrolyte powder in the rolling mixture not exceed 70%, being preferably 30 to 50%. The particle size of the electrode powder which is electrode material that has been pulverized needs to be matched to that of the respective mixture partner.

The porosity of the separator can be influenced by the particle size distribution of the ceramic material, the particle porosity, and the proportion of electrolyte in the mixture to be rolled.

A preferred separator structure consists, for example, of a uniform mixture of coarse grained particles and finely divided powder of the previously mentioned ceramic materials. The coarse grained particles have the function of separating the electrodes, the fine particles serve as particle barrier, or retainer. The coarse grained particles have a diameter smaller than 2.0 mm, preferably between 0.1 and 1.0 mm; the fine grained particles have a diameter less than 150 $\mu$m, preferably 5 to 60 $\mu$m. The volume proportion of the coarse grained solid content is 10 to 90%, and preferably 40 to 80%, that of the finely divided content is 90 to 10%, preferably 60 to 20%.

In a specific example, such a separator structure is produced in accordance with the invention by stirring a mixture of the above-described particles to which powdered electrolyte has also been added, into a solution of polyisobutylene (average molecular weight about 15,000) in cyclohexane. The quantity relationships are so chosen that the polyisobutylene proportion in the solvent-free mixture amounts to 1-30% by weight, and preferably 3-15% by weight. The polyisobutylene content in the cyclohexane can amount to 50% by weight and is preferably 5-15% by weight. These figures can also be used for other plastics, for example, polyhydrocarbons other than polyisobutylene and corresponding solvents.

The solvent is removed after stirring by heating, if desired in a vacuum, and the mixture is then rolled into a cohesive, uniformly thick plate of 0.1-3.0 mm thickness and preferably 0.3-2.0 mm thickness.

The plate is cut to the desired dimensions and placed between the electrodes. The completed cell is then heated to a temperature of more than 320° C., for example, 340°-400° C., whereupon the gaseous decomposition products of the polyisobutylene escape from the cell. This must be performed in the absence of air. Thereafter the cell can be made ready for operation by melting of the electrolyte which is already present in the cell, and if appropriate, by filling with molten liquid electrolyte.

Another preferred separator structure consists of three layers. The two outer layers contain predominantly the finely divided separator particles, the inner layer predominantly coarse grained separator particles. Each of these layers is initially prepared in the previously described manner; subsequently the three layers are placed between the electrodes in the sequence described. They can also be previously united through being rolled together.

A third preferred separator structure also consists of three layers. The two outer layers contain predominantly the finely divided separator particles with the synthetic plastic additives; the middle layer consists of a mat or fabric of ceramic material, e.g. boron nitride (BN). This BN material has the function of stabilizing the separator mechanically; the outer layers serve as particle barrier.

The two outer layers are produced by rolling; they are placed upon the middle layer, or united with it by being rolled together. In so doing it is desirable to impregnate the boron nitride with the same plastic, preferably polyisobutylene, so that the outer layers adhere well to the middle layer. In this way the frequently fragile textile ceramic product is turned into a stable and easily handleable structural component.

By rolling together of the ceramic separator with the electrode plates which have been produced in analogous fashion, there is obtained in accordance with the invention the finished electrode block in a particularly compact form, in which the entire cell electrolyte is furthermore integrated.

In producing the separator or the electrode plates in air, it is further desirable to first remove from the mixture an electrolyte component which may be hygroscopic, for example the LiCl in the preferably utilized LiCl-KCl electrolyte. This is then created ultimately in the melt by diffusion with the KCl which is already present in the separator.

Thermal decomposition of the plastic (polyisobutylene) and driving off of the decomposition products from the assembled electrode block should be carried out with caution and is best done under vacuum to protect the active electrode materials from air.

We claim:

1. A manufacturing process for an electrochemical high temperature cell having a solid positive electrode, a solid negative electrode, a separator of finely divided ceramic material, and a molten liquid electrolyte which is retained within the said cell components, the process comprising mixing starting material of the separator and/or of the electrodes with electrolyte powder and with a synthetic plastic which is decomposable without residue under heat, said starting material being electrode powder for the electrodes and being finely divided ceramic for the separator, rolling the mixture into a cohesive plate of uniform thickness, assembling the plates individually or after being rolled together into composite electrode(s)/separator plates into a cell, and heating the cell after completed assembly above the decomposition temperature of the plastic so as to decompose said plastic without residue and below the operating temperature of the cell.

2. The process of claim 1 wherein the plastic is a polyhydrocarbon with quarternary carbon groups.

3. The process of claim 2 wherein the polyhydrocarbon is polyisobutylene.

4. The process of claim 3 wherein the starting material of the separator and/or of the electrodes mixed with electrolyte powder is stirred into a solution of polyisobutylene in cyclohexane up to a 50% solution, the solvent is subsequently vaporized, about 1-30% by volume of polyisobutylene containing solvent-free mixture is rolled into a cohesive plate of uniform thickness, the plates are assembled into the cell either individually or after being rolled together into composite electrode(s)/separator plates, and the cell is heated to a temperature of between 320 and 400 degrees centigrade after complete assembly so as to decompose said plastic without residue.

5. The process of claim 4 wherein the solution is preferably a 5-15% solution and the polyisobutylene content is preferably 3-15% by volume.

6. The process of claim 1 wherein the starting material of the separator is a uniform mixture of coarse grained ceramic particles and finely divided ceramic powder.

7. The process of claim 6 wherein said starting material comprises
coarse grained particles have a diameter below 2 mm and their volume porportion in the separator structure is 10–90%.

8. The process of claim 7 wherein the coarse grained particles have a diameter of 0.1–1.0 mm and their volume proportion is 40–80%.

9. The process of claim 6 wherein the fine powder particles have a diameter of less than 150μm and their volume proportion in the separator structure is 90–10%.

10. The process of claim 9 wherein the fine powder particles have a diameter of 5–60μm and their volume porportion in the separator structure is 60–20%.

11. The process of claim 4 wherein the separator mixture is uniformly rolled into a cohesive plate of the thickness of 0.1–3.0 mm.

12. The process of claim 11 wherein the thickness is 0.3–2.0 mm.

13. The process of claim 1 wherein the separator plate consisting predominantly of finely divided ceramic material is rolled prior to assembly onto a separator material consisting predominantly of coarsely grained ceramic material, or upon a fabric or matting of ceramic material, in each case on both sides.

14. A process for forming a separator for an electrochemical high temperature cell comprising
mixing finely divided ceramic material with electrolyte powder and polyisobutylene, said electrolyte being present in an amount not more than 70% by volume,
rolling the mixture into a cohesive plate of uniform thickness,
assembling the plate as a component of said cell, and then
heating the cell above the decomposition temperature of said polyisobutylene but below the operating temperature of the cell so as to decompose without residue said polyisobutylene.

15. The process according to claim 14 including melting the electrolyte present in said cell.

16. The process according to claim 14 including filling the cell with molten electrolyte.

17. The process of claim 1 wherein the cell operating temperature is approximately 450° C. and the temperature to which the cell is heated to decompose the plastic is in the range of 340° to 400° C.

* * * * *